(12) United States Patent
McEldowney et al.

(10) Patent No.: US 8,330,822 B2
(45) Date of Patent: Dec. 11, 2012

(54) THERMALLY-TUNED DEPTH CAMERA LIGHT SOURCE

(75) Inventors: Scott McEldowney, Redmond, WA (US); Prafulla Masalkar, Issaquah, WA (US); Yun Fang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 12/797,410

(22) Filed: Jun. 9, 2010

(65) Prior Publication Data

US 2011/0304281 A1    Dec. 15, 2011

(51) Int. Cl.
H04N 9/04    (2006.01)

(52) U.S. Cl. ............. 348/207.99; 348/211.4; 348/211.6; 348/231.6; 315/309; 396/155; 396/164

(58) Field of Classification Search .................... 348/49, 348/207.99, 211.4, 211.6, 228.1, 231.6, 231.9, 348/342, 366, E5.029; 396/155, 164, 168; 315/309, 307
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |

(Continued)

FOREIGN PATENT DOCUMENTS

CN    201254344 B    6/2010

(Continued)

OTHER PUBLICATIONS

Hack, Erwin., "Combined Shearography and Thermography Measurements on Microelectronic Systems", Retrieved at http://www.ndt.net/article/v07n04/hack/hack.htm , vol. 7, No. 04, Apr. 2002, pp. 4.

(Continued)

*Primary Examiner* — Haiss Philogene
(74) *Attorney, Agent, or Firm* — Alleman Hall McCoy Russell & Tuttle LLP (57) ABSTRACT

Various embodiments are disclosed for setting a depth camera light source operating temperature in a thermal tuning mode executed during a depth camera manufacturing process. One embodiment of a method includes illuminating a target with light from a light source at a plurality of light source temperatures; for each light source temperature, sensing an intensity of reflected light received at a light sensor through a light filter positioned intermediate the target and the light sensor; approximating a frequency response relationship between a light filter cutoff frequency and a light source emission wavelength based on a comparison of the sensed intensities and stored reference data; generating a temperature set point so that the light source emission wavelength does not overlap the light filter cutoff frequency by more than a predetermined overlap threshold; and programming a temperature controller to control the light source to the temperature set point during depth camera operation.

20 Claims, 5 Drawing Sheets

U.S. PATENT DOCUMENTS

| | | |
|---|---|---|
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,133,569 A | 10/2000 | Shoda et al. |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,573,939 B1 * | 6/2003 | Yokoyama ............ 348/375 |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,795,237 B1 | 9/2004 | Marinelli et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,952,233 B2 | 10/2005 | Nagano |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,499 B2 | 5/2008 | Kawakami |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,599,732 B2 | 10/2009 | Sevick-Muraca et al. |
| 7,607,509 B2 | 10/2009 | Schmiz et al. |
| 7,608,822 B2 | 10/2009 | Remillard et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |

| | | | |
|---|---|---|---|
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2005/0082480 A1 | 4/2005 | Wagner et al. | |
| 2008/0026838 A1 | 1/2008 | Dunstan et al. | |
| 2010/0097389 A1* | 4/2010 | Lim et al. | 345/589 |
| 2012/0056982 A1* | 3/2012 | Katz et al. | 348/43 |
| 2012/0075534 A1* | 3/2012 | Katz et al. | 348/602 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD—Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture—Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

THERMALLY-TUNED DEPTH CAMERA LIGHT SOURCE

BACKGROUND

Depth cameras used to create three-dimensional images of objects typically include imaging filters for filtering ambient light from imaging light projected from a depth camera imaging light source. For efficient operation, most of the imaging light received at the imaging filter should be transmitted to a depth camera imaging sensor while most of the ambient light should be filtered. However, unless the imaging filter is matched to the imaging light wavelength, it becomes more difficult to filter ambient light without reducing the transmission of imaging light.

Some approaches to improving ambient light filtering without reducing the transmission of imaging light include using tunable imaging filters. However, tunable imaging filters may be expensive and may require complicated feedback circuitry to operate. Some other approaches include testing multiple imaging filters and imaging light sources so that couples may be identified and paired. However, such approaches may require expensive testing and maintenance of large inventories.

SUMMARY

Various embodiments are disclosed for setting a depth camera light source operating temperature in a thermal tuning mode executed during a depth camera manufacturing process. One embodiment of a method includes illuminating a target with light from a light source at a plurality of light source temperatures; for each light source temperature, sensing an intensity of reflected light received at a light sensor through a light filter positioned intermediate the target and the light sensor; approximating a frequency response relationship between a light filter cutoff frequency and a light source emission wavelength based on a comparison of the sensed intensities and stored reference data; generating a temperature set point so that the light source emission wavelength does not overlap the light filter cutoff frequency by more than a predetermined overlap threshold; and programming a temperature controller to control the light source to the temperature set point during depth camera operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Depth cameras may be used to create a three-dimensional image of an object from distance information captured along with image information at various depth camera pixels. For example, a depth camera may be used to build a three-dimensional model of a person being imaged by the depth camera, which can be displayed or, in some scenarios, used as input for game software of a gaming system. Thus, in this example, the three-dimensional model of the person may be used to present a graphical representation of the person in a video game display, for example by including the model in a game cut scene, or may be used to receive user input from the modeled person, such that other interactive elements of the game software, such as non-player characters, artifacts, etc., respond to movements of the modeled person.

Depth cameras typically include an illumination system to illuminate an object to be imaged with illumination light and an imaging system for generating an object image based on illumination light reflected from the object. In some examples, the illumination light may be structured light used to provide an interference pattern analyzed by the imaging system to determine three-dimensional information. In some other examples, the illumination light may be pulsed light used to provide a basis for time-of-flight measurements performed by the imaging system to determine three-dimensional information. Regardless of the method by which the depth information is captured, the imaging system is typically configured to sense reflected illumination light at a light sensor, which in some embodiments may be a charge coupled device.

Because ambient light may interfere with the analysis performed by the imaging system, in some embodiments, a light filter, such as a band pass filter, may be included in the imaging system for filtering a portion of ambient light from reflected illumination light prior to the light sensor. For example, a light filter used with an infrared light source may be configured to reject visible light and transmit infrared light. Thus, in some embodiments, the illumination light source and the light filter may be configured so that an emission wavelength of the illumination light overlaps with a pass band of the light filter. However, because of natural variation in light source and light filter manufacturing operations, some light sources may have an emission wavelength that overlaps a cutoff wavelength of some light filters. Put another way, because the illumination light frequency falls outside of the pass band of the light filter, the light filter may not pass some or all of the reflected illumination light to the light sensor. Accordingly, in some embodiments, the emission wavelength of the light source may be thermally tuned to overlap the pass band of the light filter.

While some of the example embodiments described below make reference to game consoles and gaming systems, it will be appreciated that these examples are provided only for descriptive purposes, and that the depth cameras described may be used in any suitable context and/or operating environment within the scope of the present disclosure. Other non-limiting example operating environments include mobile wireless devices, client computing devices, and server computing devices.

Figure 1:
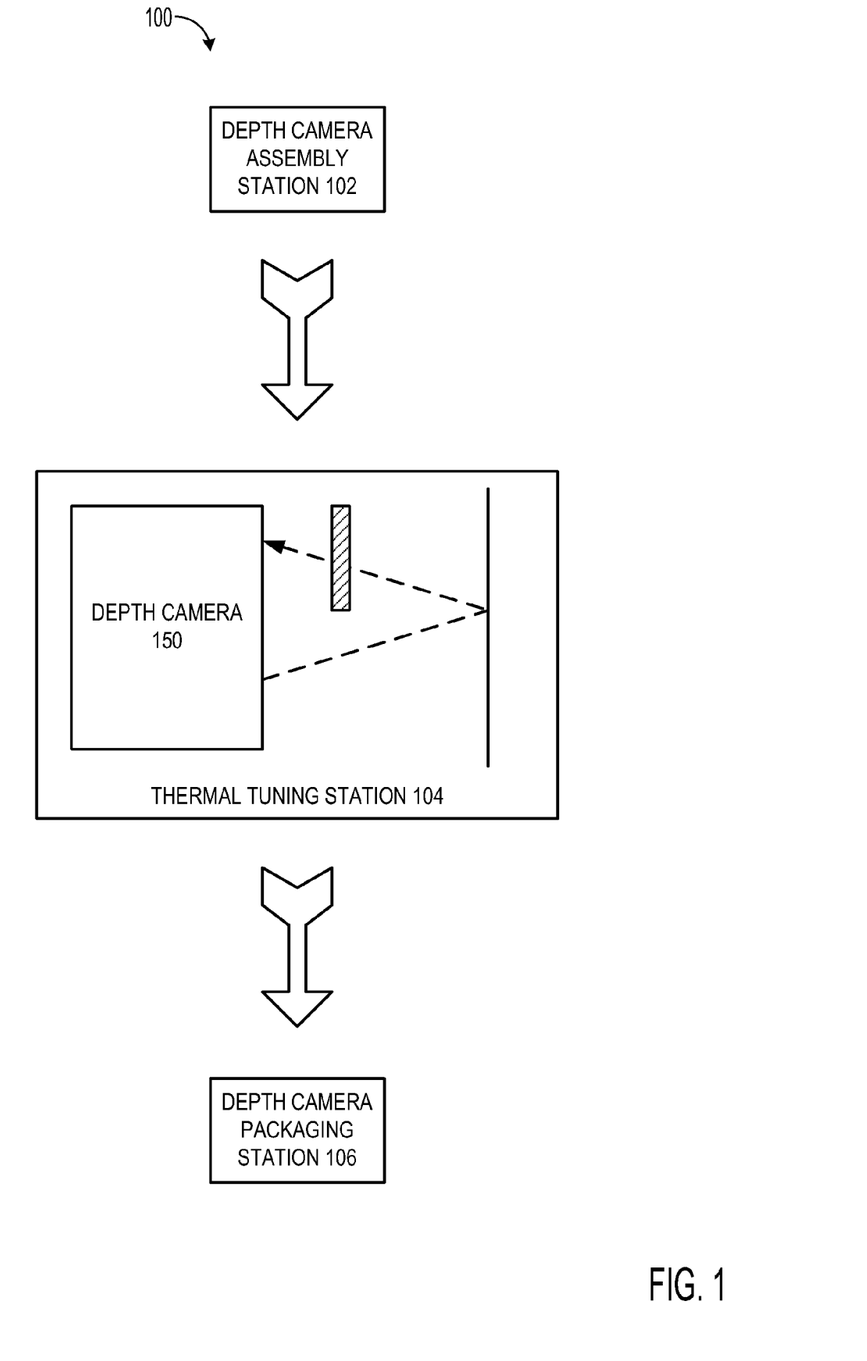
FIG. 1 schematically shows an operating environment for a depth camera assembly system according to an embodiment of the present disclosure.

FIG. 1 shows an embodiment of a depth camera assembly system 100 for assembling, configuring, and packaging depth cameras for shipment to customers. As shown in FIG. 1, depth camera assembly system 100 includes a depth camera assembly station 102 for assembling a depth camera 150. For example, an illumination system and an imaging system may be installed into depth camera 150 at depth camera assembly station 102.

At thermal tuning station 104, a thermal tuning module executed by thermal tuning station 104 may, in a thermal tuning mode of the manufacturing process (the details of which are described in more detail below) thermally tune the emission wavelength of the depth camera light source so that it overlaps at least a portion of the pass band of the light filter. Additionally or alternatively, in some embodiments, the light source emission wavelength may be thermally tuned so that the emission wavelength of the light source does not overlap a cutoff frequency of the light filter by more than a predetermined permissible overlap threshold.

It will be appreciated that the wavelength of light emitted by a light source of the depth camera 150 may vary slightly based on material and manufacturing conditions, particularly since tightly controlling the tolerance on the wavelength frequency of the light source will undesirably increase the manufacturing costs, and thus light sources of lower tolerances may be selected for use in manufacture. Thermal tuning of the light source emission wavelength in this manner described herein may allow light filters and light sources to be assembled into a depth camera without first verifying that the light filter will pass the emission wavelength to the light sensor. In turn, this may allow the depth camera manufacturer to avoid using high cost light sources with tightly controlled tolerances, and to avoid time-consuming light source and light filter pairing tests and/or maintaining a large inventory of light sources and light filters that perform to slightly different wavelengths.

In some embodiments, the light source emission wavelength may be tuned at thermal tuning station 104 by first approximating a frequency response relationship between a cutoff frequency of the light filter and the emission wavelength of the light source. This approximation may be based on a comparison of light intensities sensed at the light sensor of the imaging system and stored intensity reference data. Subsequently, a static operating temperature set point for the light source may be generated based on the approximation. Once the static operating temperature set point is generated, a light source temperature controller may be programmed with the set point so that the set point temperature is maintained during a depth camera operation mode, as described below in detail in reference to FIG. 3.

In the example shown in FIG. 1, once the light source temperature controller is programmed with the static operating temperature set point, depth camera 150 is passed to depth camera packaging station 106, where depth camera 150 is packaged for shipment to consumers, at the conclusion of the manufacturing process. A first use of depth camera 150 by a consumer marks the start of the depth camera operating mode. In the example shown in FIG. 1, the thermal tuning mode is only performed during manufacturing of depth camera 150. However, it will be appreciated that, in some embodiments, the thermal tuning mode may be performed at any suitable time when the depth camera is not in an operating mode. Example instances where thermal tuning mode may be performed include, but are not limited to, instances in response to an initial boot-up and/or power-on of the depth camera, in response to a command received from a central server (such as during a firmware and/or software upgrade event for the depth camera), and/or in response to a user command to perform the thermal tuning mode received by the depth camera.

Figure 3:
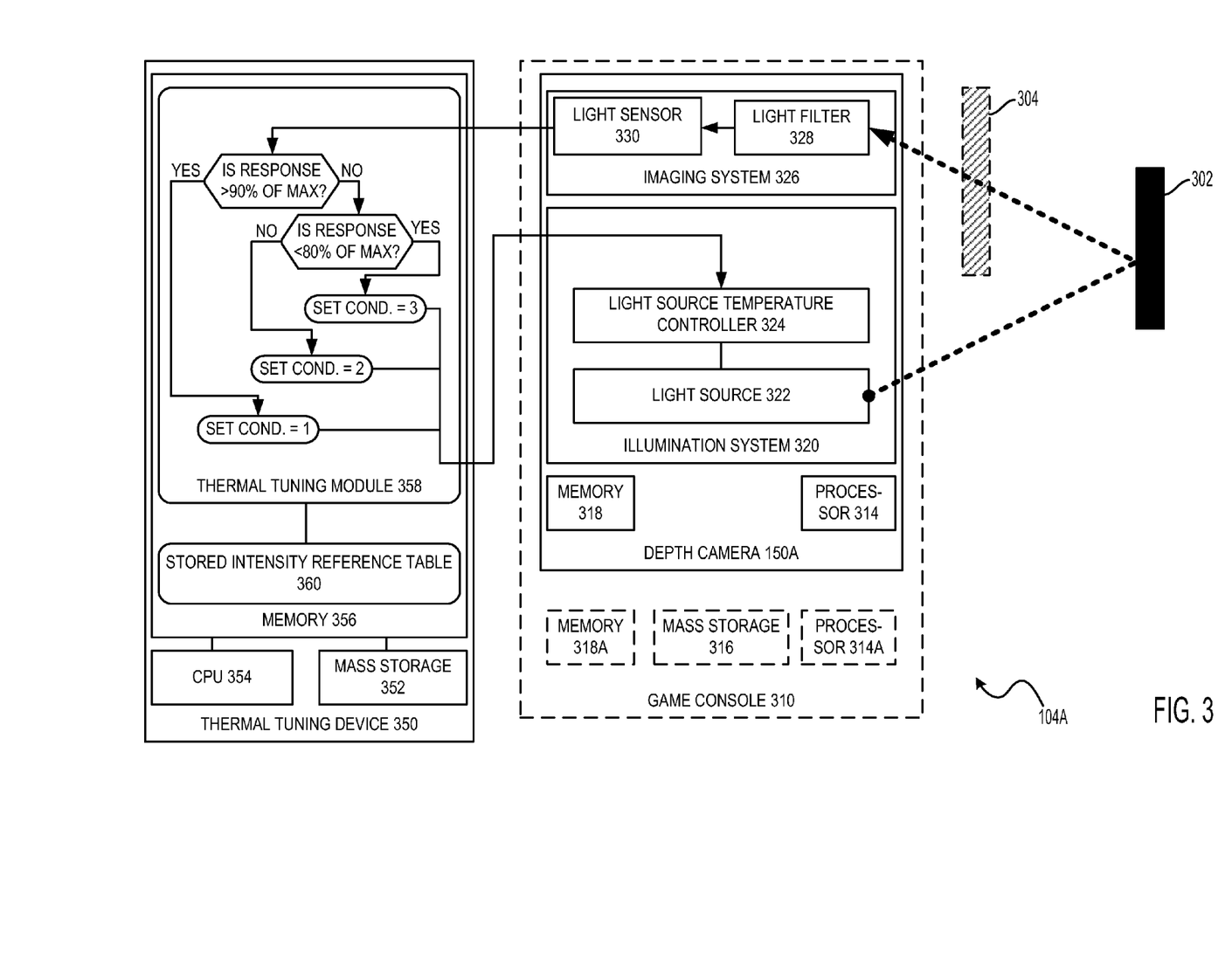
FIG. 3 schematically shows a thermal tuning station for a depth camera light source according to an embodiment of the present disclosure.

FIG. 3 shows an embodiment of a thermal tuning station 104A, including a thermal tuning device 350 in electrical communication with a depth camera 150A. In this embodiment, depth camera 150A is a computing device component that includes a processor 314 and memory 318. Depth camera 150A also includes an illumination system 320 and an imaging system 326. In some embodiments, depth camera 150A may be included in a game console 310, which may include its own processor 314A, memory 318A, and associated mass storage device 316A. Likewise, thermal tuning device 350 is a computing device that includes a processor 354, mass storage 352, and memory 356, and includes program logic stored thereon to execute the functionality described herein. It will be appreciated that the embodiment of thermal tuning station 104A shown in FIG. 3 is merely illustrative, and that other suitable embodiments such as the embodiment illustrated in FIG. 5 discussed below may be employed within the scope of the present disclosure.

The thermal tuning mode referenced above is described in more detail with reference to FIG. 2, which shows a flow chart for an embodiment of a thermal tuning method 200. Thermal tuning method 200 may be performed by any suitable hardware and/or software, including the hardware and software modules illustrated in FIG. 3, discussed above, and FIG. 5, discussed below.

Figure 4:
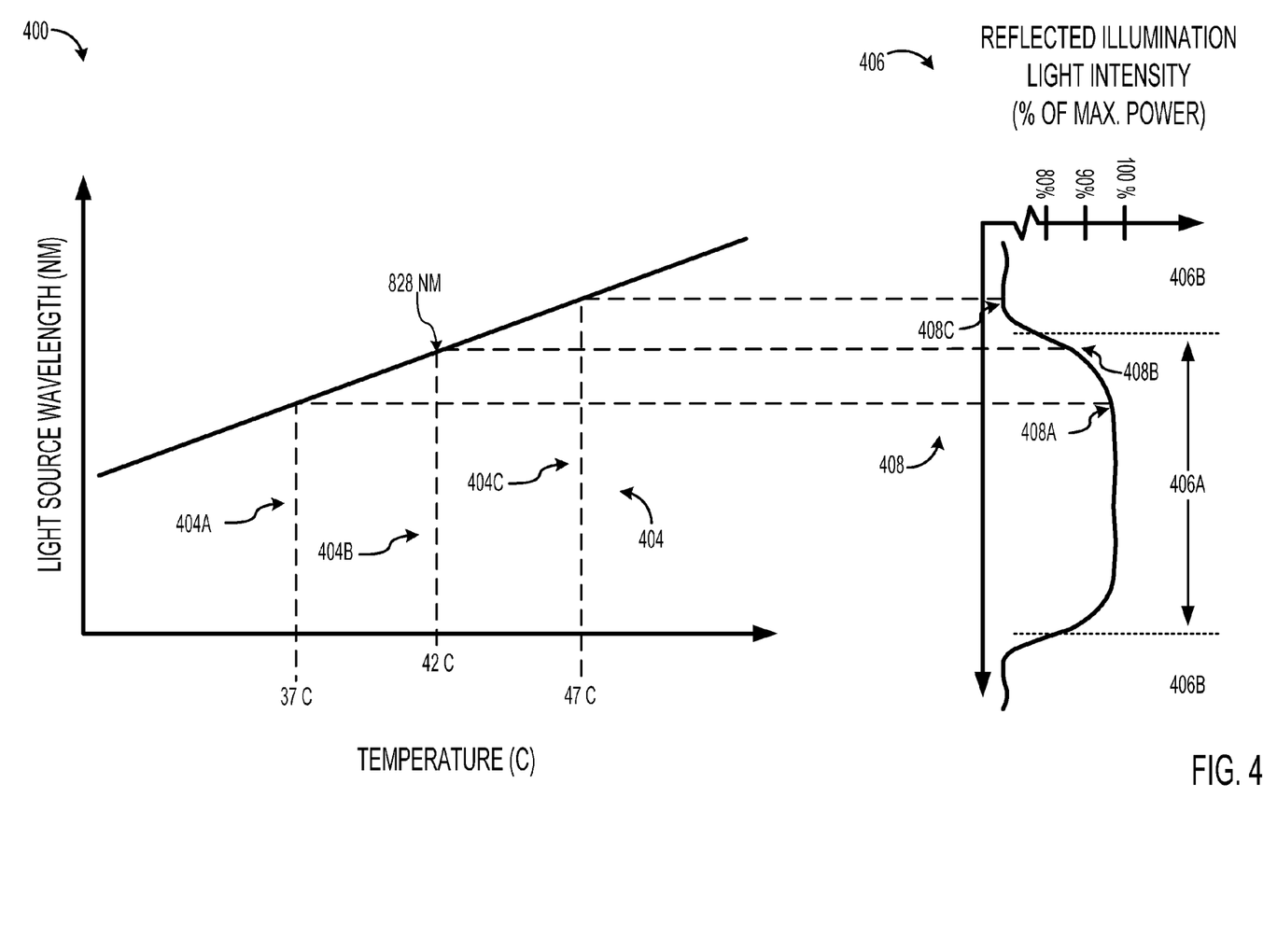
FIG. 4 schematically shows a correlation between an emission wavelength of a light source and light source temperature, and also schematically shows a correlation between light source temperature and a cutoff frequency of a light filter according to an embodiment of the present disclosure.

Method 200 comprises, at 202, during a thermal tuning mode for a light source of a depth camera executed during a manufacturing process for the depth camera, setting a light source tuning temperature at the illumination system. For some light sources, such as light emitting diode lasers, varying light source temperature may vary the emission wavelength of the light source. For example, FIG. 4 shows an example correlation 400 between light source emission wavelength and light source temperature. In the example shown in FIG. 4, setting a light source temperature to 42 degrees C. leads to light emission at 828 nm. Increasing the light source temperature leads to a corresponding increase in emission wavelength. For reference, a theoretical adjustment of the light source temperature by 30 degrees C. may result in a 10 nm wavelength shift for a standard edge emitting Fabret-Perot laser, although such a dramatic adjustment may not be typical during tuning in a manufacturing setting.

A suitable approach for setting the light source tuning temperature may be employed as follows. In the embodiment shown in FIG. 3, illumination system 320 includes a light source temperature controller 324 in thermal communication with light source 322. In some embodiments, light source temperature controller 324 may include a thermoelectric device for heating and/or cooling light source 322 in response to a programmed temperature set point, though it will be appreciated other devices for varying light source temperature (e.g., fans and/or heat exchangers) may be included in light source temperature controller 324. Further, it will be appreciated that, in some embodiments, light source temperature controller 324 may include suitable programs stored in controller memory for controlling a temperature of light source 322.

Figure 2:
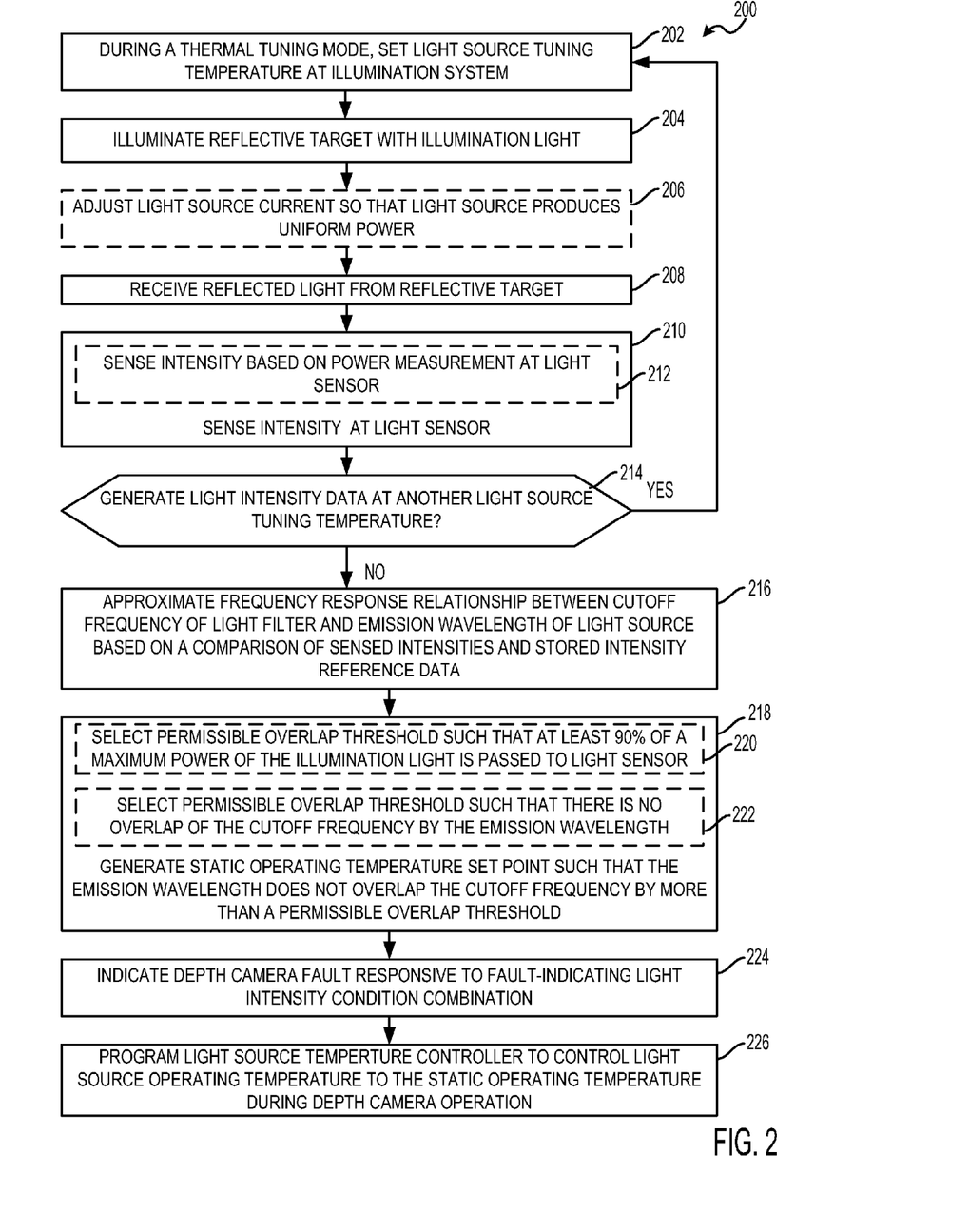
FIG. 2 shows a flow chart for a method of thermally tuning a depth camera light source according to an embodiment of the present disclosure.

Continuing with FIG. 2, at 204, method 200 includes illuminating a reflective target with illumination light from a light source of the depth camera at the light source tuning temperature. Any suitable light source may be employed for generating the illumination light. A non-limiting example of a light source may include one or more light emitting diode lasers configured to emit infrared light at one or more emission wavelengths. In the embodiment shown in FIG. 3, light source 322 is included in illumination system 320 of depth camera 150A. However, it will be appreciated that, in some embodiments, the light source may be a standalone light source, or may be included in a depth camera peripheral device.

It will be appreciated that any suitable reflective target may be employed within the scope of the present disclosure. In the example shown in FIG. 3, reflective target 304 is shown being illuminated by light source 322. In some embodiments, the reflective target may include a reflective field having a white color, though it will be appreciated that other colors may be included and/or substituted in some embodiments. Further, in some embodiments, the reflective target may include various patterns, textures, and/or shapes. The reflective target may be positioned any suitable distance from the depth camera. In some non-limiting examples, the reflective target may be positioned approximately 1.2 meters from the depth camera.

In some embodiments, optics included in illumination system 320 may include one or more diffraction gratings for tuning the projected illumination light. These diffraction gratings may introduce optical artifacts in the reflected illumination light which may, when detected by the light sensor, manifest as shadows and/or hot spots. Because hot spots may saturate some light sensors and cause loss and/or distortion of sensed intensity data, in some embodiments the reflected illumination light may pass through an optical diffuser positioned intermediate the reflective target and the light filter prior to being received by the light sensor. This may smooth discrete optical artifacts and avoid saturation at the light sensor. For example, in the embodiment shown in FIG. 3, reflected illumination light is depicted passing through optical diffuser 304 prior to being received at imaging system 326.

Continuing with FIG. 2, in some embodiments, method 200 includes, at 206, adjusting a light source current at each light source tuning temperature so that the light source produces a uniform power at every light source tuning temperature. Using this approach, a relative light source power (compared to a reference light source power) may be determined based on a light intensity measurement at the light sensor. The relative light source power may then form a basis for approximating a frequency response relationship between a cutoff frequency of the light filter and an emission wavelength of the light source and for setting a static operating temperature set point based thereon. While FIG. 2 refers to a current adjustment for maintain a uniform light source power, it will be appreciated that any suitable approach to maintaining a uniform light source power may be employed within the scope of the present disclosure. Table 1 provides example current adjustment parameters for a light source to maintain a uniform power of approximately 180 mW across an example range of light source tuning temperatures.

TABLE 1

| Relative Temperature (° C.) | Relative Current (mA) |
| --- | --- |
| −7 | 0.930 |
| −5 | 0.949 |
| −3 | 0.967 |
| −1 | 0.989 |
| Initial Light Source Power Calibration Temperature (42° C.) | 1.000 |
| +1 | 1.012 |
| +3 | 1.036 |
| +5 | 1.060 |
| +7 | 1.092 |

At 208, method 200 includes receiving reflected illumination light from the reflective target at the light sensor, the reflected illumination light passing through the light filter prior to being received at the light sensor. In the embodiment shown in FIG. 3, illumination light reflected by reflective target 302 is received at light filter 328. Light filter 328 passes a portion of the reflected illumination light to light sensor 330. While the embodiment of light filter 328 in FIG. 3 is described as a band pass filter, it will be appreciated that any suitable light filter having a cutoff frequency may be employed within the scope of the present embodiment.

Light sensor 330 is a device for sensing light intensity. For example, in one scenario, light sensor 330 may include one or more charge coupled devices for generating light intensity signals from incident photons. Additionally, in some embodiments, light sensor 330 may be configured to include a plurality of sensor pixels distributed in an array, each sensor pixel generating a light intensity signal. Such a light sensor may average (for example, by a geometric average) multiple light intensity signals, each light intensity signal corresponding to a photogeneration rate at a different light sensor pixel. In one scenario, the light sensor may average light intensity signals from the entire light sensor; in another scenario, the light sensor may average light intensity signals from selected portions of the light sensor, such as a central portion.

Continuing with FIG. 2, at 210, method 200 includes sensing an intensity of reflected illumination light received at the light sensor of the depth camera through a light filter positioned intermediate the reflective target and the light sensor. In the example shown in FIG. 3, reflected illumination light passes through light filter 328 and is received at light sensor 330.

In some embodiments, sensing intensity at the light sensor includes, at 212, determining a relative light power based on a sensed intensity. For example, in a scenario where the light source current is adjusted to produce illumination light with a known, uniform power setting, sensed light intensity may be proportional to the amount of light passed through the light filter. Thus, a comparison of sensed intensity for the known power setting to sensed intensity at one of the light source tuning temperatures may provide an estimate of an amount of frequency overlap between the light filter and the light sensor. For example, in a scenario where the emission wavelength does not overlap the cutoff frequency range of the light filter, the sensed intensity should be approximately the same as the sensed intensity at the reference power. In another scenario, where the emission wavelength does overlap the cutoff frequency range, the sensed intensity will be attenuated relative to the sensed intensity at the reference power. It will be appreciated that any suitable reference power setting may be used to establish a power reference intensity. For example, in some embodiments, a sensed light intensity corresponding to a maximum light source power may be the power reference intensity.

At 214, method 200 determines whether an intensity measurement at another light source tuning temperature is indicated. If additional light source tuning temperatures are indicated, method 200 returns to 202, and the next light source tuning temperature is set. If no additional light source tuning temperatures are indicated, method 200 continues to 216.

Sensed intensities, and in some embodiments, determinations of relative light power, from different light source tuning temperatures may be accumulated to reveal a relationship between the light filter cutoff frequency and the emission wavelength of the light source as established by the light source temperature. Thus, at 216, method 200 includes approximating a frequency response relationship between a cutoff frequency of the light filter and an emission wavelength of the light source based on a comparison of the sensed intensities and stored intensity reference data. One example approach for approximating the frequency response relationship according to an embodiment of the present disclosure is described below. However, it will be appreciated that any suitable approach to approximate a relationship between light filter pass band and the emission wavelength of the light source may be employed within the scope of the present disclosure.

Thus, turning to the embodiment shown in FIG. 3, a light intensity signal from light sensor 330 is passed to thermal tuning module 358. In this embodiment, the sensed intensity is classified by comparing the sensed intensity to stored intensity reference data. Specifically, in this example the sensed intensity is compared to a maximum power reference intensity. An example classification of three sensed intensities corresponding to three respective light source tuning temperatures will be explained with reference to FIGS. 3 and 4 below.

In addition to depicting an example correlation 400 between light source emission wavelength and light source temperature, FIG. 4 shows an example correlation 406 between reflected illumination light intensity, as detected by the light sensor, and light source temperature linked via a plurality of tie lines 404. Correlation 406 may generally be divided into a pass band 406A and cutoff frequency ranges 406B. Thus, at a first light source tuning temperature of 37 degrees C., represented by tie line 404A, emission wavelength 408A overlaps pass band 406A. As depicted in FIG. 4, emission wavelength 408A produces a sensed intensity of more than 90% of a maximum power reference intensity for the light sensor. Thus, with reference now to FIG. 3, a light classification condition is set to a value of 1 at thermal tuning module 358.

At a second light source tuning temperature of 42 degrees C., represented by tie line 404B of FIG. 4, emission wavelength 408B overlaps more of cutoff frequency range 406B in comparison to emission wavelength 408A. Thus, the sensed intensity of emission wavelength 408B is less than the sensed intensity of emission wavelength 408A. As depicted in FIG. 4, the sensed intensity of emission wavelength 408B is less than 90% of the maximum power reference intensity, but more than 80% of the maximum power reference intensity. Thus, with reference now to FIG. 3, a light classification condition is set to a value of 2 at thermal tuning module 358.

At a third light source tuning temperature, represented by tie line 404C of FIG. 4, emission wavelength 408C lies within cutoff frequency range 406B. As depicted in FIG. 4, the sensed intensity of emission wavelength 408C is less than 80% of the maximum power reference intensity. Thus, with reference now to FIG. 3, a light classification condition is set to a value of 3 at thermal tuning module 358.

Taken together, these light classification conditions and the corresponding light source tuning temperatures provide a basis for approximating a frequency response relationship between the cutoff frequency of the light filter and the emission wavelength of the light source. Specifically, it will be appreciated that increasing the temperature of the light source causes the emission wavelength of the light source to be shifted from the pass band of the light filter to the cutoff frequency range.

It will be appreciated that, once approximated, a frequency response relationship may provide a basis for generating the static operating temperature set point. Thus, continuing with FIG. 2, at 218, method 200 includes generating a static operating temperature set point for the light source so that the emission wavelength of the light source does not overlap the cutoff frequency of the light filter by more than a predetermined permissible overlap threshold. For example, in some embodiments, the frequency response relationship may be compared to a lookup table included in the stored reference intensity data. The lookup table may include a plurality of static operating temperature set point decisions for a plurality of light classification conditions at various light source tuning temperatures. For example, the embodiment shown in FIG. 3 includes stored intensity reference table 360, which provides stored intensity reference data to thermal tuning module 358. Table 2 provides an example lookup table for three light source tuning temperatures, where a light classification condition of 1 corresponds to a sensed power of greater than 90% of a maximum power reference; a light classification condition of 2 corresponds to a sensed power of less than 90% but more than 80% of the maximum power reference; and a light classification condition of 3 corresponds to a sensed power of less than 80% of the maximum power reference. For example, in the example described above, the sensed intensity data corresponding to the set of light source tuning temperatures (37° C., 42° C., 47° C.) was classified as (1, 2, 3). With reference to Table 2, the generated static operating temperature set point would be 37 degrees C.

TABLE 2

| Light Classification Condition (According to Light Source Tuning Temperature) | | | Static Operating Temperature Set |
|---|---|---|---|
| 37° C. | 42° C. | 47° C. | Point (° C.) |
| 1 | 1 | 1 | 42 |
| 1 | 1 | 2 | 40 |
| 1 | 1 | 3 | 37 |
| 1 | 2 | 2 | 37 |
| 1 | 2 | 3 | 37 |
| 1 | 3 | 3 | 37 |
| 1 | 2 | 1 | 42 |
| 2 | 1 | 1 | 44 |
| 2 | 1 | 2 | 42 |
| 2 | 1 | 3 | 42 |
| 2 | 2 | 1 | 44 |
| 3 | 1 | 1 | 44 |
| 3 | 1 | 2 | 42 |
| 3 | 1 | 3 | 42 |
| 3 | 2 | 1 | 47 |
| 3 | 3 | 1 | 47 |

Because the emission wavelength of the light source may comprise an emission band of the light source, the predetermined permissible overlap threshold is configured to define an acceptable amount of overlap of the cutoff frequency with the emission wavelength. This may provide an approach to defining a manufacturing tolerance for the illumination system. For example, the predetermined permissible overlap threshold may include a manufacturer-supplied tolerance corresponding to a statistical process control limit for the depth camera manufacturing process. Thus, continuing with FIG. 2, in some embodiments, generating a static operating temperature set point may include, at 220, selecting the predetermined permissible overlap threshold so that at least 90% of a maximum power of the illumination light is passed to the light sensor by the light filter during depth camera operation. While the example predetermined permissible overlap threshold depicted in FIG. 2 is defined relative to the maximum power of the illumination light, it will be appreciated that any suitable approach to defining the predetermined permissible overlap threshold may be employed. Example approaches include, but are not limited to, defining the predetermined permissible overlap threshold relative to a full-width, half-maximum of the filtered illumination light and/or relative to a variance of the light filter and/or the light source. In some embodiments, the predetermined permissible overlap threshold may be included with the stored intensity reference data, though it will be appreciated that in some embodiments, the predetermined permissible overlap threshold may be stored in any suitable location, including memory of the depth camera and/or the thermal tuning device. Alternatively, in some other embodiments, generating a static operating temperature set point may include, at 222, selecting the predetermined permissible overlap threshold so that there is no overlap of the cutoff frequency of the light filter by the emission wavelength of the light source.

Optionally, method 200 may include, at 224, indicating a depth camera fault based on a comparison of the sensed intensities and stored intensity reference data. This may provide an approach to diagnosing predefined faults through the observation of physically unrealistic operating conditions. In some embodiments, the stored reference intensity data may include depth camera fault information for setting a fault condition based on sensed intensities. Table 3 includes example predefined fault conditions stored in lookup table form, using the same light classification conditions as Table 2.

TABLE 3

| Light Classification Condition Light Source Tuning Temperature | | | |
|---|---|---|---|
| 37° C. | 42° C. | 47° C. | Set Fault Condition? |
| 1 | 1 | 1 | No |
| 1 | 1 | 2 | No |
| 1 | 1 | 3 | No |
| 1 | 2 | 2 | No |
| 1 | 2 | 3 | No |
| 1 | 3 | 2 | Fault |
| 1 | 3 | 3 | No |
| 1 | 2 | 1 | No |
| 1 | 3 | 1 | Fault |
| 2 | 1 | 1 | No |
| 2 | 1 | 2 | No |
| 2 | 1 | 3 | No |
| 2 | 2 | 2 | Fault |
| 2 | 2 | 3 | Fault |
| 2 | 3 | 2 | Fault |
| 2 | 3 | 3 | Fault |
| 2 | 2 | 1 | No |
| 2 | 3 | 1 | Fault |
| 3 | 1 | 1 | No |
| 3 | 1 | 2 | No |
| 3 | 1 | 3 | No |
| 3 | 2 | 2 | Fault |
| 3 | 2 | 3 | Fault |
| 3 | 3 | 2 | Fault |
| 3 | 3 | 3 | Fault |
| 3 | 2 | 1 | No |
| 3 | 3 | 1 | No |

At 226, method 200 concludes with programming a light source temperature controller to control a light source operating temperature to the static operating temperature during depth camera operation. For example, with reference to the example described above and to FIG. 3, the static operating temperature set point would be programmed into light source temperature controller 324, so that, light source temperature controller 324 will control the temperature of light source 322 to 37 degrees C. once depth camera 150A enters an operating mode.

Figure 5:
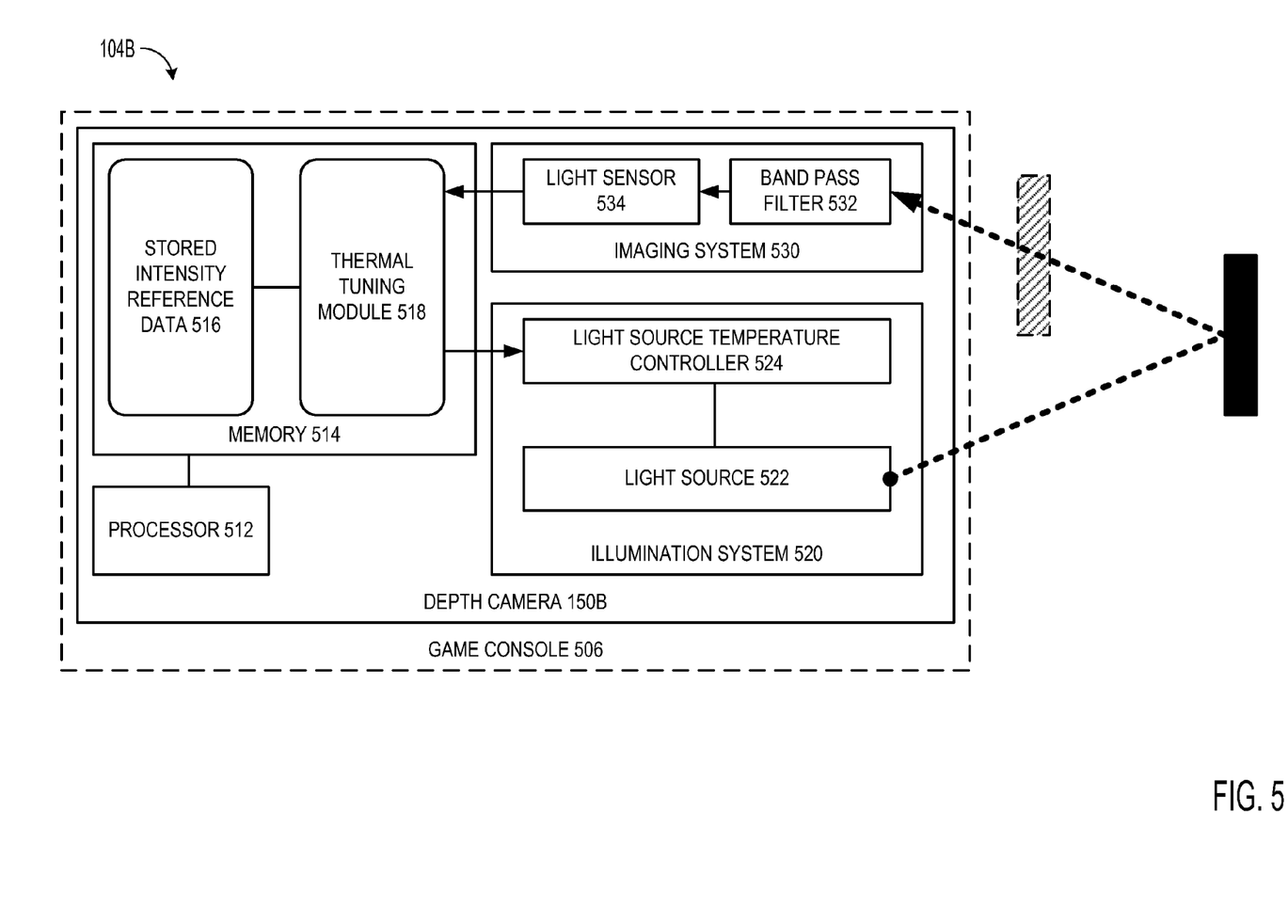
FIG. 5 schematically shows another embodiment of a depth camera according to the present disclosure.

While the above example method has been described with reference to FIG. 3, it will be appreciated that, in some embodiments, a portion or all of the elements described in thermal tuning device 350 may be included in the depth camera. This may provide on-board capability for thermally tuning the light source. For example, FIG. 5 schematically shows another embodiment of a thermal tuning station 104B having a depth camera 150B, including an illumination system 520 and an imaging system 530. Illumination system 520 includes a light source 522 and a light source temperature controller 524. Imaging system 530 includes a band pass filter 532 and a light sensor 534. Depth camera 150B also includes thermal tuning module 518 and stored intensity reference data 516 stored in memory 514 for execution by processor 512. It will be appreciated that in other embodiments the depth camera may output raw images for processing by a processor and memory of a game console 506.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A thermal tuning system for a light source of a depth camera, the depth camera including the light source for generating illumination light and a light sensor for generating light intensity data from reflected illumination light, the thermal tuning system comprising:
   a reflective target; and
   a thermal tuning station comprising:
      a memory,
      a processor, and
      a thermal tuning module executed by processor of the tuning station using portions of the memory and comprising instructions to, in a thermal tuning mode of the light source executed during a manufacturing process:
         illuminate a reflective target with illumination light from the light source at a plurality of light source tuning temperatures,
         for each light source tuning temperature, sense an intensity of reflected illumination light received at the light sensor through a light filter positioned intermediate the reflective target and the light sensor;
         approximate a frequency response relationship between a cutoff frequency of the light filter and an emission wavelength of the light source based on a comparison of sensed intensities and stored intensity reference data;
         generate a static operating temperature set point for the light source so that the emission wavelength of the light source does not overlap the cutoff frequency of the light filter by more than a predetermined permissible overlap threshold; and
         program a light source temperature controller to control a light source operating temperature to the static operating temperature during depth camera operation.

2. The thermal tuning system of claim 1, further comprising an optical diffuser positioned intermediate the reflective target and the light filter.

3. The thermal tuning system of claim 1, further comprising instructions to adjust a light source current at each of the light source tuning temperatures so that the light source produces a uniform power for each of the light source tuning temperatures during the thermal tuning mode.

4. The thermal tuning system of claim 3, wherein the intensity is generated from an average photogeneration rate at the light sensor.

5. The thermal tuning system of claim 4, wherein the average photogeneration rate is a geometric average of multiple light intensity signals, each light intensity signal generated at a different light sensor pixel.

6. The thermal tuning system of claim 1, wherein the stored intensity reference data includes a lookup table comprising a plurality of static operating temperature set point decisions.

7. The thermal tuning system of claim 1, wherein the predetermined permissible overlap threshold is selected so that at least 90% of a maximum power of the illumination light is passed to the light sensor by the light filter during depth camera operation.

8. The thermal tuning system of claim 1, wherein the predetermined permissible overlap threshold is selected so that there is no overlap of the cutoff frequency of the light filter by the emission wavelength of the light source.

9. A thermal tuning method for setting a light source operating temperature of a depth camera, the method comprising, in a thermal tuning mode of the light source:
illuminating a reflective target with illumination light from a light source of the depth camera at a plurality of light source tuning temperatures;
for each light source tuning temperature, sensing an intensity of reflected illumination light received at the light sensor of the depth camera through a light filter positioned intermediate the reflective target and the light sensor;
approximating a frequency response relationship between a cutoff frequency of the light filter and an emission wavelength of the light source based on a comparison of the sensed intensities and stored intensity reference data;
generating a static operating temperature set point for the light source so that the emission wavelength of the light source does not overlap the cutoff frequency of the light filter by more than a predetermined permissible overlap threshold; and
programming a light source temperature controller to control a light source operating temperature to the static operating temperature during depth camera operation.

10. The thermal tuning method of claim 9, wherein generating the static operating temperature set point includes selecting the predetermined permissible overlap threshold so that at least 90% of a maximum power of the illumination light is passed to the light sensor by the light filter during depth camera operation.

11. The thermal tuning method of claim 9, wherein generating the static operating temperature set point includes selecting the predetermined permissible overlap threshold so that there is no overlap of the cutoff frequency of the light filter by the emission wavelength of the light source.

12. The thermal tuning method of claim 9, wherein the stored intensity reference data includes a lookup table comprising a plurality of static operating temperature set point decisions.

13. The thermal tuning method of claim 9, further comprising indicating a depth camera fault based on a comparison of the sensed intensities and stored intensity reference data.

14. The thermal tuning method of claim 9, further comprising receiving reflected illumination light from the reflective target, the reflected light passing through an optical diffuser positioned intermediate the reflective target and the light filter.

15. The thermal tuning method of claim 14, further comprising adjusting a light source current at each of the light source tuning temperatures so that the light source produces a uniform power for each of the light source tuning temperatures during the thermal tuning mode.

16. The thermal tuning method of claim 15, wherein sensing an intensity further comprises determining a relative light source power based on the sensed intensity.

17. The thermal tuning method of claim 15, wherein sensing an intensity further includes averaging multiple light intensity signals, each light intensity signal corresponding to a photogeneration rate at a different light sensor pixel within a central region of the light sensor.

18. A game console, comprising:
memory;
a processor;
a depth camera including:
a light source for generating illumination light,
a thermoelectric temperature controller in thermal communication with the light source,
a light sensor configured to generate light intensity data responsive to a portion of reflected illumination light received at the light sensor, and
a thermal tuning module executed by processor of the depth camera using portions of the memory and comprising instructions to, in a thermal tuning mode of the light source executed during the manufacturing process:
illuminate a reflective target with illumination light from the light source at a plurality of light source tuning temperatures,
for each light source tuning temperature, sense an intensity of reflected illumination light received at the light sensor through a light filter positioned intermediate the reflective target and the light sensor;
approximate a frequency response relationship between a cutoff frequency of the light filter and an emission wavelength of the light source based on a comparison of sensed intensities and stored intensity reference data;
generate a static operating temperature set point for the light source so that the emission wavelength of the light source does not overlap the cutoff frequency of the light filter by more than a predetermined permissible overlap threshold; and
program the thermoelectric temperature controller to control a light source operating temperature to the static operating temperature during depth camera operation.

19. The game console of claim 18, further comprising instructions to:
adjust a light source current at each of the light source tuning temperatures so that the light source produces a uniform power for each of the light source tuning temperatures during the thermal tuning mode, wherein the intensity is generated from an average of multiple light intensity signals, each light intensity signal corresponding to a photogeneration rate at a different light sensor pixel in a central region of the light sensor.

20. The game console of claim 19, wherein the predetermined permissible overlap threshold is selected so that at least 90% of a maximum power of the illumination light is passed to the light sensor by the light filter during depth camera operation and wherein the stored intensity reference data includes a lookup table comprising a plurality of static operating temperature set point decisions.

* * * * *